(12) United States Patent
Hooper et al.

(10) Patent No.: US 7,398,479 B2
(45) Date of Patent: Jul. 8, 2008

(54) METHOD AND SYSTEM FOR CALENDAR-BASED IMAGE ASSET ORGANIZATION

(75) Inventors: David Hooper, Victoria (CA); Yida Mao, Victoria (CA)

(73) Assignee: ACD Systems, Ltd., Victoria (CA)

( * ) Notice: Subject to any disclaimer, the term of this patent is extended or adjusted under 35 U.S.C. 154(b) by 481 days.

(21) Appl. No.: 10/645,260

(22) Filed: Aug. 20, 2003

(65) Prior Publication Data

US 2005/0044066 A1  Feb. 24, 2005

(51) Int. Cl.
 *G06F 3/048* (2006.01)
(52) U.S. Cl. .................. 715/838; 715/968; 715/764; 715/853; 715/810; 715/841; 707/100; 707/102
(58) Field of Classification Search ............ 348/207.99; 705/8; 715/963, 764, 769, 968, 838, 853; 715/810; 707/102, 530, 100; 706/6; 382/284
See application file for complete search history.

(56) References Cited

U.S. PATENT DOCUMENTS

| | | | | |
|---|---|---|---|---|
| 6,085,205 A * | 7/2000 | Peairs et al. | ................. | 715/530 |
| 6,654,029 B1 * | 11/2003 | Chiu et al. | .................. | 715/717 |
| 6,654,760 B2 * | 11/2003 | Baskins et al. | ............. | 707/101 |
| 6,990,481 B1 * | 1/2006 | Coile | ........................... | 707/2 |
| 7,010,751 B2 * | 3/2006 | Shneiderman | .............. | 715/764 |
| 2002/0140820 A1 * | 10/2002 | Borden | .................. | 348/207.99 |
| 2003/0033296 A1 * | 2/2003 | Rothmuller et al. | ............ | 707/3 |
| 2003/0039408 A1 | 2/2003 | Smith | | |
| 2003/0156138 A1 * | 8/2003 | Vronay et al. | .............. | 345/772 |
| 2004/0027931 A1 | 2/2004 | Morita | | |
| 2004/0126038 A1 * | 7/2004 | Aublant et al. | ............. | 382/305 |
| 2004/0189707 A1 | 9/2004 | Moore et al. | | |
| 2004/0267700 A1 | 12/2004 | Dumais et al. | | |
| 2005/0160113 A1 | 7/2005 | Sipusic et al. | | |
| 2006/0077461 A1 | 4/2006 | Camara et al. | | |
| 2006/0161867 A1 | 7/2006 | Drucker et al. | | |

OTHER PUBLICATIONS

Fototime, "http://fototime.com/ftweb/fahelp/", 434.htm (published Jul. 27, 2003), 321.htm (published on Sep. 7, 2001), 256.htm (published Oct. 14, 2001).*
Rosebrock et al., "Store Images in Your Database", published Feb. 2001.*
Rodden et al. "How do People Manage Their Digital Photographs", Apr. 5-10, 2003, pp. 409-416.*
Tan et al., "SmartAlbum—A Multi-Modal Photo Annotation System", published on Dec. 1-6, 2002, pp. 87-88.*

(Continued)

*Primary Examiner*—Weilun Lo
*Assistant Examiner*—TuyetLien Tran
(74) *Attorney, Agent, or Firm*—Blakely, Sokoloff, Taylor & Zafman LLP

(57) ABSTRACT

A calendar-based image asset organizer, including a user interface for designating at least one date range, an image date reader for determining a date associated with an image, and an image query manager for identifying images having an associated date within the designated at least one date range. A method and a computer readable storage medium are also described and claimed.

22 Claims, 5 Drawing Sheets

OTHER PUBLICATIONS

Kuchinsky et al, "FotoFile: A Consumer Multimedia Organization and Retrieval System", publsihed on May 15-20, 1999, pp. 496-503.*

Graham, A., et al., "Time As Essence For Photo Browsing Through Person digital Libraries," JCDL 2002 Proceedings, Jun. 26, 2002, pp. 326-335.

"Quick Date Filtering," Downloaded: Aug. 8, 2003, available: http://www.fototime.com/ftweb/fahelp/210.htm 2 pages.

http/www.fototime.com/ftweb/fahelp/138.htm, 212.htm; published on Jul. 27, 2003.

* cited by examiner

METHOD AND SYSTEM FOR CALENDAR-BASED IMAGE ASSET ORGANIZATION

FIELD OF THE INVENTION

The present invention relates to organization of content, and in particular to organization of images based on dates.

BACKGROUND OF THE INVENTION

With today's growth and advances in image capture devices, digital images are proliferating at a rate nearly equal to that of traditional film-based photographs. Digital scanners and digital still and video cameras with mega-pixel resolutions are becoming more and more affordable, and producing higher and higher quality images.

Conventional film-based photographs and video reels have often been saved in numerous photo albums and "shoe boxes". As users of digital capture devices accumulate numbers of images into the thousands, organization of their images becomes nearly intractable. In order to be able to efficiently access their digital images using prior art hardware and software, users are typically required to manually classify images in terms of categories and sub-categories, or by key words or captions, or to manually save them within appropriate file folders and sub-folders. If a user's selection of categories and sub-categories, or folders and sub-folders is not carefully planned, search and retrieval of desired images will be overly time-consuming, and the user may have to re-classify his entire archive of images. Consider, for example, how time consuming it typically is for a user to locate a specific e-mail he received a year ago, within the thousands of e-mails he receives per year; even more so with digital images, which are intended to be preserved for generations.

Thus a major concern of users of digital images today is efficient archival and retrieval, for large archives of images over long time spans.

SUMMARY OF THE INVENTION

The present invention provides a method and system for organizing digital images in an automatic and transparent way, without requiring manual work on the part of a user. The present invention uses dates of images for automatic storage and retrieval, so that a user can access his images according to their dates. In fact, this approach resembles the way people often save film-based photographs in shoe boxes, according to chronological events such as "Birthday Party 1968", "Wedding 1978" and "Summer Vacation "1988". Capture devices generally write a digital date and time stamp within image files. The present invention uses this information automatically without requiring manual entry by a user.

In a preferred embodiment of the present invention, the date information upon which storage and retrieval relies is a capture date recorded with an image at its time of acquisition. Such a date is available within an Exchangeable Image File (EXIF) file header. EXIF is a standard format for storing interchange information in image files, especially for images that are stored using JPEG compression. The EXIF format is part of the Design Rules for Camera File System (DCF) standard created by the Japanese Electronic Industry Development Association (JEIDA), to encourage interoperability between imaging devices. EXIF supports the storage of extended camera information within the header of each JPEG file, including inter alia the date & time the image was taken, exposure information (ISO, shutter, aperture) and other extended camera details. Today, most digital cameras use the EXIF format.

The present invention preferably includes a graphical user interface having a calendar display, making it intuitive and easy for a user to select a date range, and for viewing images having a date within the selected range.

There is thus provided in accordance with a preferred embodiment of the present invention a calendar-based image asset organizer, including a user interface for designating at least one date range, an image date reader for determining a date associated with an image, and an image query manager for identifying images having an associated date within the designated at least one date range.

There is further provided in accordance with a preferred embodiment of the present invention a method for organizing image assets, including receiving at least one designated date range, determining dates associated with images, and identifying images having an associated date within the at least one designated date range.

There is yet further provided in accordance with a preferred embodiment of the present invention a computer-readable storage medium storing program code for causing a computer to perform the steps of receiving at least one designated date range, determining dates associated with images, and identifying images having an associated date within the at least one designated date range.

There is moreover provided in accordance with a preferred embodiment of the present invention a calendar-based digital content organizer, including a user interface for designating at least one date range, a date reader for determining dates associated with digital content, and a query manager for identifying digital content having an associated date within the at least one designated date range.

There is additionally provided in accordance with a preferred embodiment of the present invention a method for organizing digital content, including receiving at least one designated date range, determining dates associated with digital content, and identifying digital content having an associated date within the at least one designated date range.

There is further provided in accordance with a preferred embodiment of the present invention a computer-readable storage medium storing program code for causing a computer to perform the steps of receiving at least one designated date range, determining dates associated with digital content, and identifying digital content having an associated date within the at least one designated date range.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

The present invention overcomes limitations of prior art image organization software and hardware, which require considerable manual user effort to organize large image archives by classification in terms of category and sub-category, or in terms of captions, or in terms of key words. The present invention provides a method and system for automatic organization of image assets according to dates associated therewith.

User Interface

Figure 1:
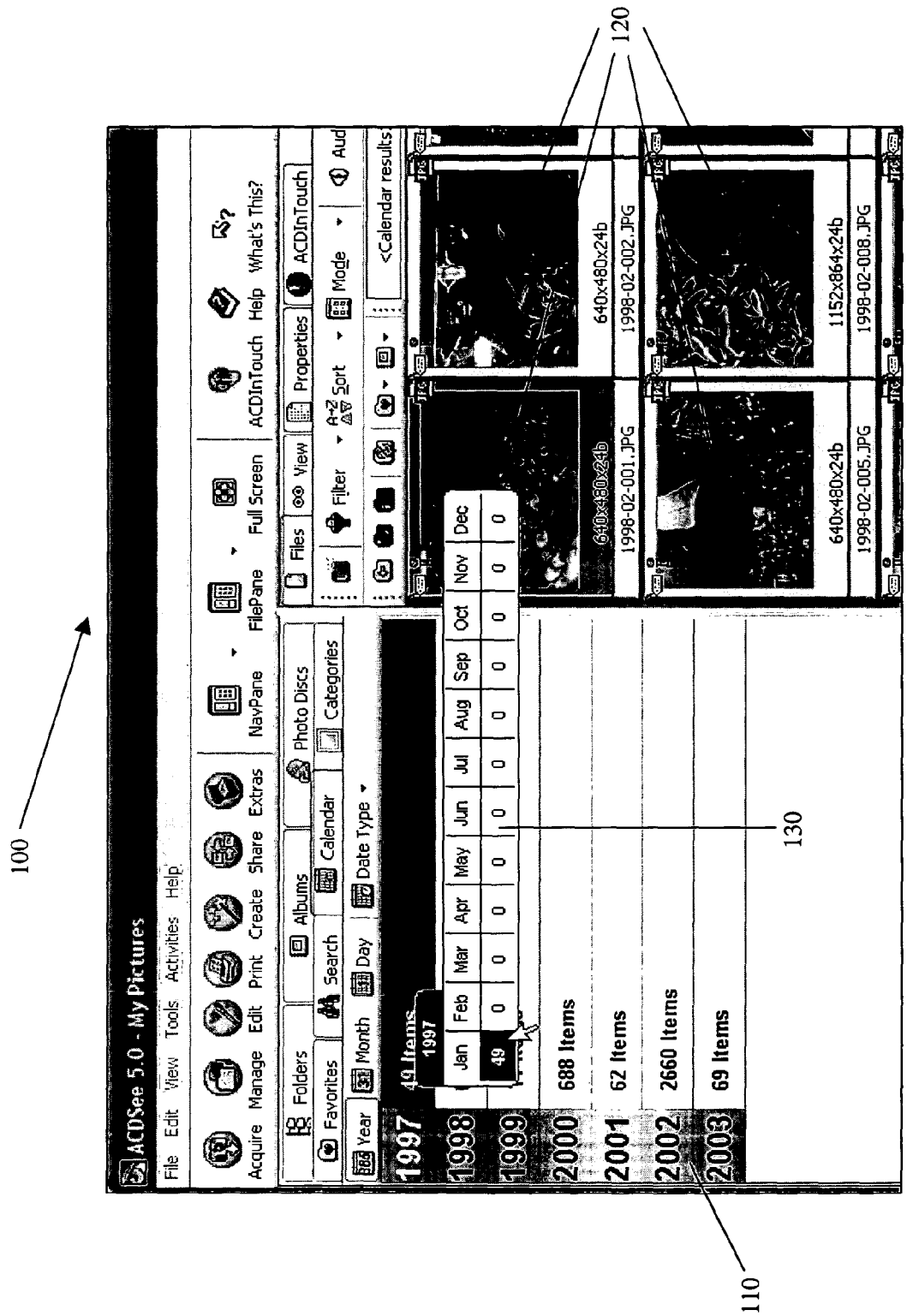
FIG. 1 is an illustration of a calendar pane year view within a user interface, in accordance with a preferred embodiment of the present invention.

Reference is now made to FIG. 1, which is an illustration of a calendar pane year view within a user interface, in accordance with a preferred embodiment of the present invention. Shown in FIG. 1 is a graphical user interface window 100 including a pane 110 displaying a calendar of years. Within each year is preferably indicated a number, indicating the number of images available within a user's image archive, having associated dates within such year. When a user left-clicks on a displayed year, he can view the images having associated dates within such year. Preferably, representations 120 of the images are displayed, the representations being small-scale versions of the images, such as thumbnail versions. In a preferred embodiment of the present invention, the user can view a full-scale version of an image by double-clicking on a representation 120 thereof.

When the user right-clicks on a displayed year, a pop-up box 130 appears, displaying the months of the year and the number of images having associated date within each such month. When the user subsequently clicks on one of the months within pop-up box 130, the user interface preferably switches to a calendar pane month view for such month, as illustrated below in FIG. 2. Also, when the user double clicks on a displayed year, representations 120 of images having associated dates within such year are displayed, and the user interface switches to the calendar pane month view for the months of such year.

Figure 2:
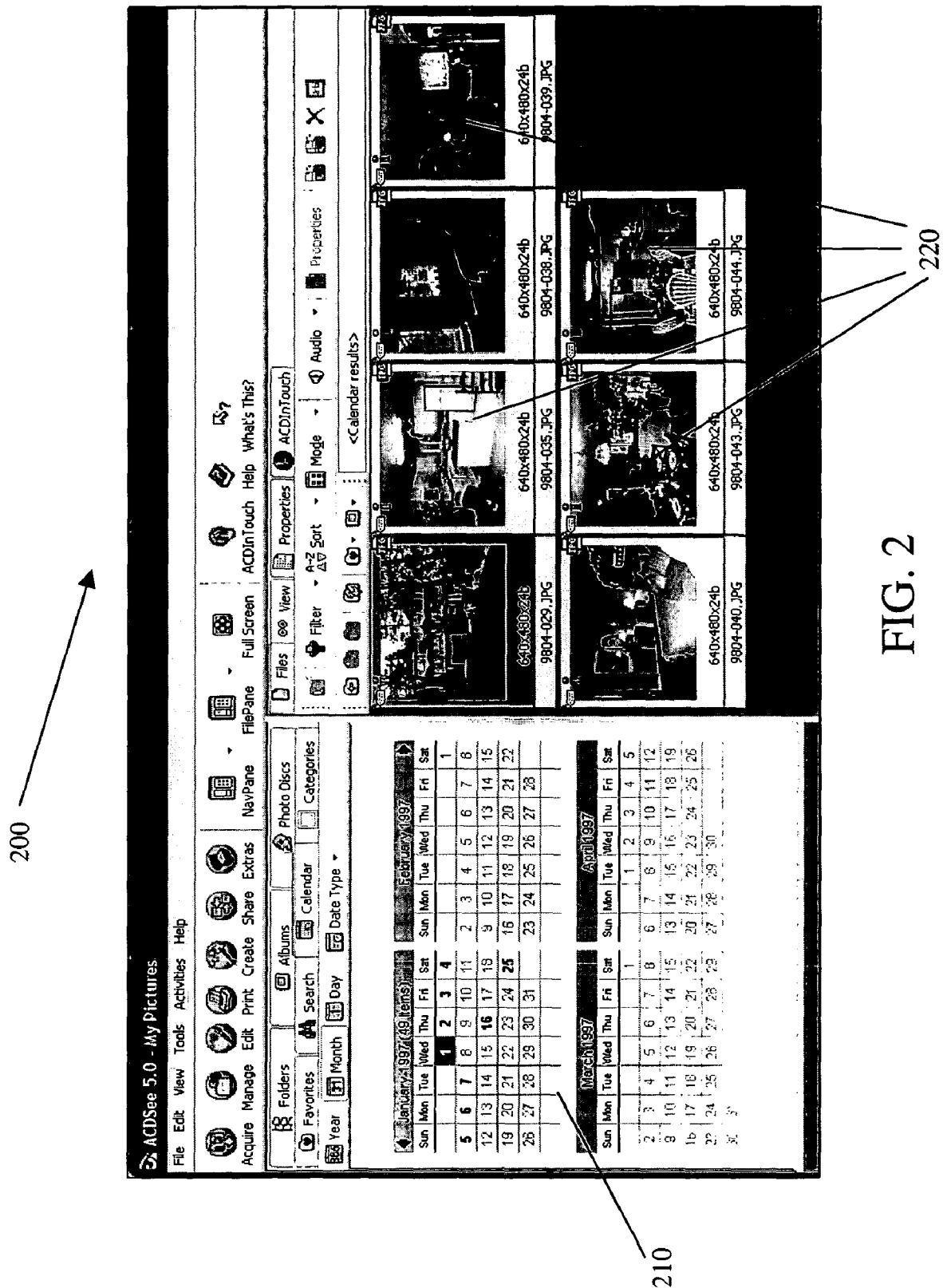
FIG. 2 is an illustration of a calendar pane month view within a user interface, in accordance with a preferred embodiment of the present invention.
Figure 3:
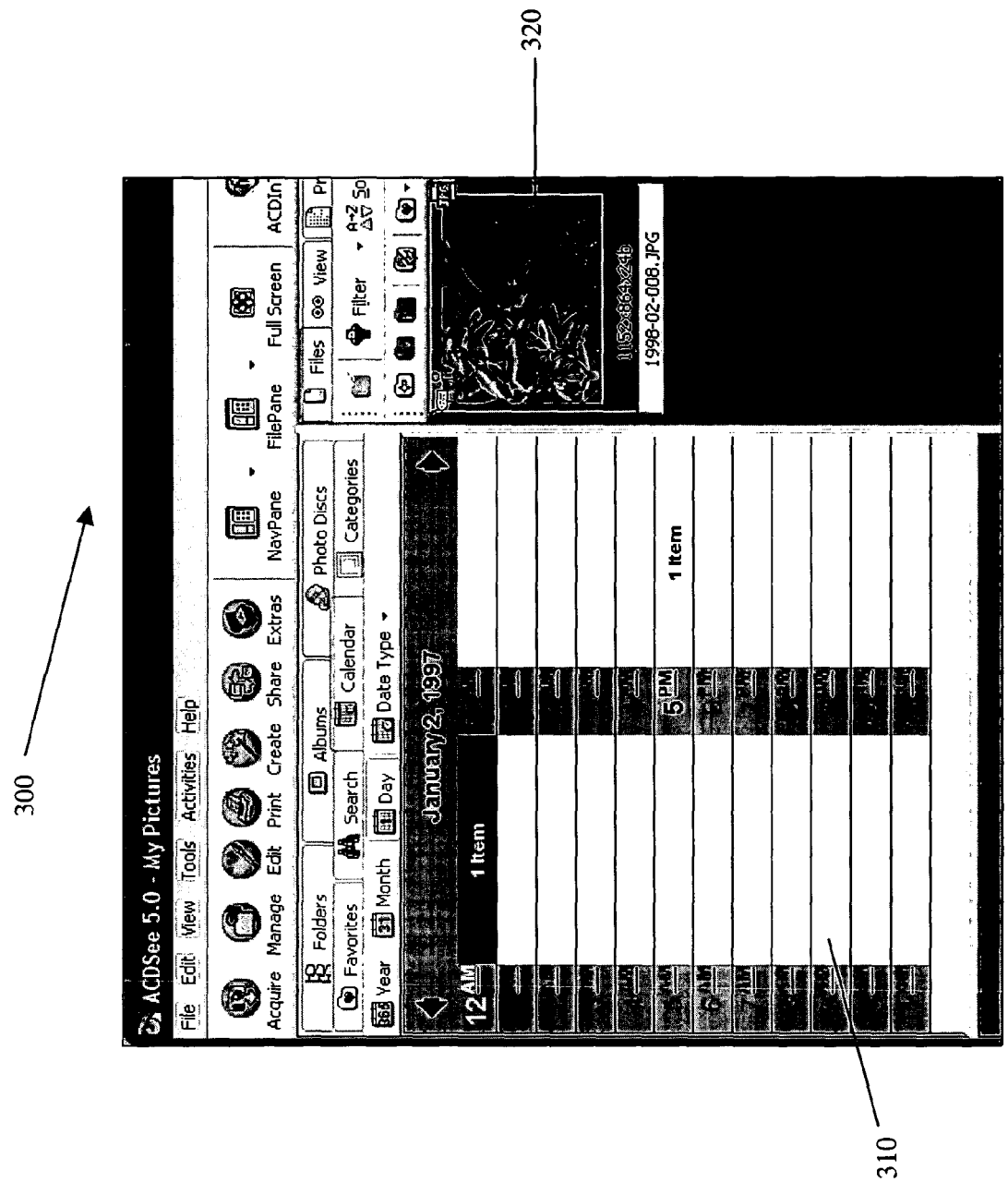
FIG. 3 is an illustration of a calendar pane day view within a user interface, in accordance with a preferred embodiment of the present invention.

It may be appreciated by those skilled in the art that the vertical layout of FIG. 1 whereby a calendar pane is at the left and image files are displayed at the right can be modified to a horizontal layout whereby the calendar as at the top and image files are displayed at the bottom. FIGS. 2 and 3 below can also be modified to such a horizontal layout.

Reference is now made to FIG. 2, which is an illustration of a calendar pane month view within a user interface, in accordance with a preferred embodiment of the present invention. Shown in FIG. 2 is a graphical user interface window 200 including a pane 210 displaying a calendar of months. Preferably, the months are displayed with days in a single combined view. When a user left-clicks within a displayed month, representations 220 of images having an associated date within such month are displayed. Similarly, when the user left-clicks on a displayed day within a displayed month, representations 220 of images having an associated date the same as such day are displayed. Preferably, the user can select one or more ranges of days, to view images having associated dates within the one or more selected ranges. For example, a user may click on a weekday, such as Tuesday, to select all Tuesdays of a specific month.

When the user double clicks on a displayed day, representations 220 of images having an associated date the same as such day are displayed, and the user interface switches to calendar pane day view, as illustrated below in FIG. 3.

Reference is now made to FIG. 3, which is an illustration of a calendar pane day view within a user interface, in accordance with a preferred embodiment of the present invention. Shown in FIG. 3 is a graphical user interface window 300 including a pane 310 displaying a calendar of hours and days. In a preferred embodiment of the present invention, the date information associated within an image includes both a date and a time. When a user left-clicks on a displayed day, representations 320 of images having an associated date within such day are displayed. When the user left-clicks on a displayed hour, representations 320 of images having an associated date within such hour are displayed. Preferably, the user can select one or more ranges of hours, to view images having a associated date within the one or more selected ranges.

In a preferred embodiment of the present invention, organization of images by dates can be based upon any of the following dates:

(i) an image capture date as stored within a file header, such as an EXIF file header, by an image capture device;

(ii) a file system date, such as the date a file containing an image was last modified; and (iii) a date manually entered by a user.

It may be appreciated that not all digital images necessarily have image capture dates associated therewith. To facilitate organization of images, some of which do and other of which do no have capture dates, the present invention preferably combines (i) and (iii) by copying existing capture dates into a database, which can be manually updated by a user. Thus, the user need only enter manual dates for those images that do not have capture dates available.

An advantage of using dates as keys for image assets is that helpful date-oriented functionality can be incorporated into the user interface.

One such functionality is the ability to step through image assets by jumping forward to the next year, month or day associated with one or more images, and backward to the previous year, month or day associated with one or more images. The forward and backward jumps automatically skip over dates that have no images associated therewith. Such functionality enables a user to browse his images event by event, since generally events are clustered within individual days. With reference to FIGS. 1-3, a user can jump forward to the next year, month or day associated with one or more images when the calendar pane year, month or day is displayed, respectively, by pressing on the <cursor up> keyboard button, and he can jump backward by pressing on the <cursor down> key.

Another such functionality is display of an appropriate image within the background of a year, month or day in the calendar. For example, with reference to the calendar pane year displayed in FIG. 2, the region in which January 1997 is rendered can have a thumbnail for a first image associated with January 1997, as a transparent background.

Another such functionality is visually marking of dates in the calendar corresponding to one or more selected images.

Another such functionality is highlighting of images that are associated with a specific date, when a user hovers his mouse pointer over a display of the date. Preferably, the image associated with the date are not selected, but only highlighted so as to make them stand out visually. Such functionality provides a user with a preview of the images that would be displayed if he were to proceed and click on the date.

Implementation Details

In a preferred embodiment of the present invention, one or more relational database tables are used to store and retrieve date information for image assets. It may be appreciated by those skilled in the art that other data structures may be used in alternative embodiments of the present invention. For example, image date information may be stored in a tree data structure, with branching based on date. Similarly, image date information may also be stored in a linked list, ordered chronologically, or in a dynamic array; i.e., an array that can expand and shrink.

Figure 4:
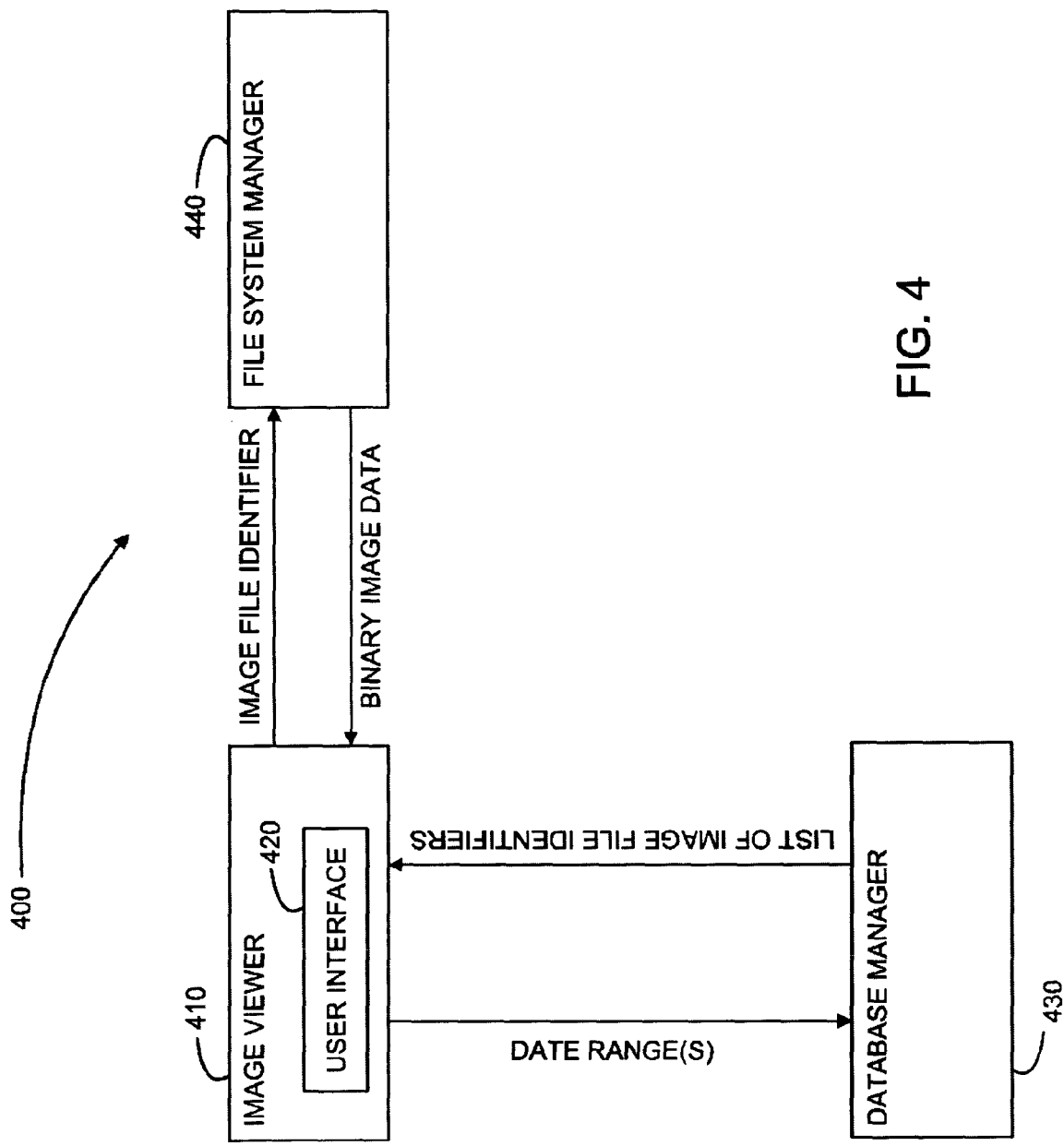
FIG. 4 is a simplified block diagram for a calendar-based image asset organizer, in accordance with a preferred embodiment of the present invention.

Reference is now made to FIG. 4, which is a simplified block diagram for a calendar-based image asset organizer 400, in accordance with a preferred embodiment of the present invention. Shown in FIG. 4 is an image viewer 410, used to render image pixel data for display by a video graphics processor on a computer monitor. Image viewer 410 includes a user interface 420, such as the user interface illustrated hereinabove in FIGS. 1-3, through which a user designates one or more date ranges.

Image viewer 410 communicates with a database manager 430, which stores and retrieves data from a relational database system. In a preferred embodiment of the present invention, the relational database system includes tables, described hereinbelow, through which images having an associated date within the one or more designated date ranges are identified. Specifically, database manager 430 provides image viewer 410 with image file identifiers for such images. In a preferred embodiment of the present invention, database manager 430 also provides thumbnail representations for such images, which are stored within the relational database tables as binary data.

Alternatively, database manager 430 may provide image viewer with one or more statistics about the images having dates within the one or more designated date ranges. For example, database manager 430 may provide the number of images within the designated ranges, as illustrated hereinabove in FIG. 1.

Image viewer 410 also communicates with a file system manager 440, which stores and retrieves file data from a computer file system. Image viewer 410 requests data from files specified by image file identifiers, and file system manager 440 provides the requested data.

Preferably, when a user double clicks on a thumbnail of an image, the full resolution image is displayed. In a preferred embodiment of the present invention, data provided by file system manager 440 includes full resolution pixel data from image files.

Alternatively, the thumbnail representations themselves may be stored within the file system, in which case file system manager 440 provides the thumbnails upon request.

In a preferred embodiment of the present invention, a relational database table is used to relate dates to image files, as follows:

TABLE I

Date - File ID Relationship

| Date-Time (CCYYMMDDHH:mm:SS) | Date Convention | File ID |
|---|---|---|
| 2003070621:49:30 | 0 = manually entered date | 1-NNNNNNNNNN |
| 2003070621:49:30 | 1 = EXIF header date | 1-NNNNNNNNNN |
| 2003070621:49:30 | 2 = file last modified date | 1-NNNNNNNNNN |

The File ID entry is a foreign key for TABLE II below. As a pair of entries, the Date Source and File ID entries form a unique key for TABLE I. However, multiple File ID's may have the same Date-Time and Date Convention entries. Similarly, the same File ID may have multiple Date-Time entries (corresponding to different Date Conventions).

In a preferred embodiment of the present invention, a relational database table is used to relate file ID's to folders and file names, as follows:

TABLE II

File ID - Folder ID + File Name Relationship

| Folder ID | File Name | File ID |
|---|---|---|
| 12345 | PICTURE.JPG | 1-NNNNNNNNNN |

The Folder ID entry is a foreign key for TABLE III below. The File ID entry is a unique key for TABLE II.

In a preferred embodiment of the present invention, a relational database table is used to relate folder ID's to folder names, as follows:

TABLE III

Folder ID - Folder Name Relationship

| Folder Name | Folder ID |
|---|---|
| C:\TOP\SUB\PICTURES\ | N |
| C:\TOP\SUB\PICTURES\FAMILY | N + 1 |

The Folder ID field is a unique key for TABLE III.

In a preferred embodiment of the present invention, database manager 430 listens for events from file system manager 440. Specifically, if a user moves a file to a different folder, or changes the name of the file, then database manager 430 receives an event notification and is able to dynamically update TABLES II and III accordingly. This mechanism ensures that TABLES II and III are synchronized with the file system.

Preferably, in order to generate unique ID's for folders and files, a table of latest used ID's is maintained, and a next ID is generated by adding 1 to the current ID. Specifically, the following TABLE IV maintains current ID information.

TABLE IV

Folder ID - Folder Name Relationship

| Name | Current ID |
|---|---|
| PATH NAME (KEY = "1") | 1-NNNNNNNNNN |
| FILE NAME (KEY = "2") | 1-NNNNNNNNNN |

Preferably, whenever a next ID is assigned, TABLE IV is updated accordingly.

Thumbnail pixel data for image assets may be stored within a file system, or within the relational database. In the latter case, preferably a table for retrieving thumbnail data is used to retrieve thumbnail data based on file ID. Specifically, the following TABLE V stores thumbnail data.

TABLE V

File ID - Thumbnail Data

| File ID | Thumbnail Data |
|---|---|
| 1-NNNNNNNNNN | Blob of binary data |

The File ID field is a unique key for TABLE V. Alternatively, multiple thumbnail versions may be stored in TABLE V, in which case a field for Thumbnail Setting is included, similar to the Date Setting field in TABLE I. In this alternative embodiment, the pair of fields, File ID and Thumbnail Setting together, constitute a unique key.

As illustrated hereinabove in FIGS. 1-3, the result of a date range query is often a multiplicity of image identifiers, and image thumbnails. To enable the client viewer to sequence through such a multiplicity, the present invention preferably supports the following two generic database commands:
FindDataForKey("Key", &BufferReturned);
ReadNext(&KeyReturned, &BufferReturned).

The FindDataForKey method accepts a key name as input and produces a buffer address for retrieved data as output, corresponding to the first item within a multiplicity of query results. The ReadNext method provides the key name for the next item within a multiplicity of query results, and the corresponding buffer address for the data associated with the key. Thus it may be appreciated, that together the methods FindDataForKey and ReadNext enable the client viewer to sequentially retrieve a multiplicity of results.

It will be apparent to those skilled in the art that there are several ways to populate the above tables. For example, a client application may initially scan specific folders in a user's hard disk, such as a default \My Pictures folder, for images and their metadata. The user may scan additional folders by activating a search for images. When the client application acquires new images by importing from a scanner or uploading from a digital camera, it may scan their metadata and enter them within the database at the time of acquisition. Since identification of image files and scanning their metadata are simple operations, a large archive of images can be scanned within minutes. Preferably, the database is persistent, and does not have to be reloaded again after the application is closed.

Figure 5:
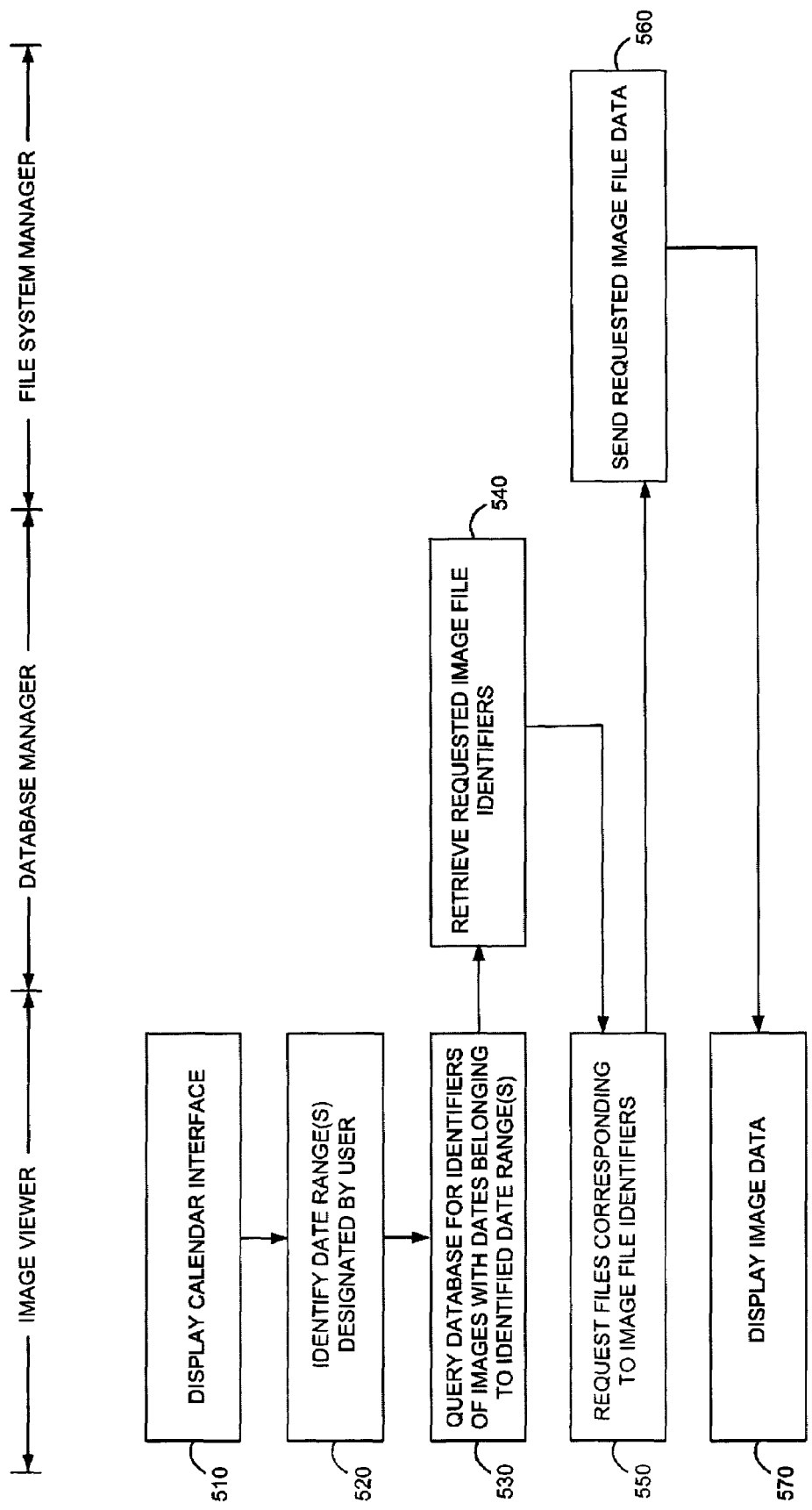
FIG. 5 is a simplified flowchart for organizing image assets, in accordance with a preferred embodiment of the present invention.

Reference is now made to FIG. 5, which is a simplified flowchart for organizing image assets, in accordance with a preferred embodiment of the present invention. FIG. 5 is divided into three columns. The leftmost column indicates steps performed by an image viewer, such as image viewer 410 (FIG. 4). The middle column indicates steps performed by a database manager, such as database manager 430. The rightmost column indicates steps performed by a file system manager, such as file system manager 440.

At step 510 the image viewer displays a calendar-based graphical user interface, such as the year/month/day user interface illustrated hereinabove in FIGS. 1-3. At step 520 the image viewer identifies one or more date ranges designated by a user via the calendar interface. At step 530 the image viewer queries the database manager for information regarding images whose dates fall within the designated one or more date ranges.

At step 540 the database manager performs the query, retrieves image file identifiers for the requested images and sends the identifiers back to the image viewer. In a preferred embodiment of the present invention, the database manager also sends thumbnail representations of the requested images. At step 550 the image viewer requests file data from the file system manager, for files identified by the image file identifiers. The file data may include full resolution image pixel data. If thumbnail representations are not delivered by the database manager, then the file data may also include the thumbnails.

At step 560 the file system manager retrieves the requested image file data and sends the data back to the image viewer. Finally, at step 570 the image viewer uses the image file data to display appropriate image data within the calendar-based user interface.

The present invention has many diverse applications. It is apparent to those skilled in the art that the present invention is not limited to digital image organization, and may be applied to organization of other digital content. For example, the present invention may be used to organize animations, slide presentations, digital video content, electronic documents and e-mail, and a combination of such types of digital content. Similarly, the present invention may be used to organize albums of images instead of individual images, where the date associated with an album is, for example, the date of the earliest image in the album. Instead of displaying thumbnails for individual images in FIG. 1-3, the user interface displays thumbnails for albums.

In reading the above description, persons skilled in the art will realize that there are many apparent variations that can be applied to the methods and systems described. One such variation is embodiment within a client-server environment, instead of a local environment. Thus, with respect to FIG. 4, database manager 430 and file system manager 440 may reside on server computers, networked together with a client computer that runs image viewer 410. Database 430 preferably has a lock mechanism that prevents multiple clients from updating the database simultaneously. For example, a single lock byte (0 or 1) can be used for global locking. When the database is opened, a "1" is written to the lock byte, and when the database is closed a "0" is written to the lock byte.

An advantage of global locking is that the database manager can detect whether the database was closed cleanly the last time it was used. If not, then the database is repaired.

It may be appreciated by those skilled in the art that other locking mechanisms may be employed, as are commonly used by database servers.

A client-server network embodiment of the present invention has wide applicability to thin client devices that do not have the capability of storing large image archives. Specifically, the present invention provides powerful image asset organization for wireless devices such as wireless PDA's and cell phones.

A client-server network embodiment of the present invention also has applicability to home networks, for organizing diverse types of multi-media content.

Another variation of the present invention is use of a calendar-based classification in conjunction with one or more other types of classifications, such as folder or category based classifications, or more generally in conjunction with a search engine. Such variation of the present invention can provide, for example, independent calendars for individual folders or categories of images, and custom calendars for images satisfying specific search criteria.

Alternatively, images from a specific category, from a specific folder or from specific search results can be identified within a single global calendar by multi-color markings. Days can be color coded so that green, for example, indicates a day for which all associated images satisfy specific search criteria; grey indicates a day for which some of the associated images satisfy the search criteria and other do not; and white indicates a day for which there are no associated images satisfying the search criteria.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer readable storage medium having computer-executable instructions stored thereon which when executed implement a calendar-based asset organizer, the medium comprising:

instructions for a digital asset manager, for receiving a search query for digital assets, and for returning a result set of identifiers for a plurality of digital assets that satisfy the query, wherein each asset in the result set has a date&time associated therewith; and instructions for a user interface, communicatively coupled with the digital asset manager, (i) for issuing the search query to the digital asset manager, (ii) for receiving the result set of the search query from the digital asset manager, (iii) for presenting a calendar view of the result set wherein years, months and days between the earliest and latest date× associated with assets in the result set are represented by cells, the cells being of uniform size and sorted by time, each cell having a display background comprising a representation of an asset in the result set whose associated date&time lies within the cell's date&time range, the calendar view comprising (a) a year view displaying one year per cell, and indicating the number of assets in the result set that have associated date× within each year, for each of the displayed years, (b) a month view displaying one month per cell, and indicating the number of assets in the result set that have associated date× within each month, for each of the displayed months, and (c) a day view displaying one day per cell, and indicating the number of assets in the result set that have associated date× within each day, for each of the displayed days, and (iv) for switching the calendar view between year view, month view and day view, wherein (1) selecting a cell for a specific year within the year view serves to display representations of the assets in the result set that have associated date× within the specific year, (2) selecting a cell for a specific month within the month view serves to display representations of the assets in the result set that have associated date× within the specific month, (3) selecting a cell for a specific day within the day view serves to display representations of the assets in the result set that have date× within the specific day, and (4) right-clicking on a cell within the year view serves to display a pop-up window displaying months within the year, and to display the number of assets in the result set that have associated date× within each month, for each of the displayed months.

2. The medium containing the calendar-based asset organizer of claim 1, wherein the date&time associated with an asset is a date&time stored by an asset capture device within a file header of a file containing the asset.

3. The medium containing the calendar-based asset organizer of claim 1, wherein the date&time associated with an asset is a date&time entered manually by a user.

4. The medium containing the calendar-based digital asset organizer of claim 1, wherein the assets are image collections comprising a plurality of individual image assets that are aggregated together, and wherein the date&time associated with an image collection is the earliest of the date× associated with the individual image assets in the collection.

5. A method for organizing assets, comprising:

issuing a search query for digital assets;

receiving a result set of identifiers for a plurality of digital assets that satisfy the search query, wherein each asset in the result set has a date&time associated therewith;

presenting a calendar view of the result set wherein years, months and days between the earliest and latest date× associated with assets in the result set are represented by cells, the cells being of uniform size and sorted by time, each cell having a display background comprising a representation of an asset in the result set whose associated date&time lies within the cell's date&time range, the calendar view comprising (a) a year view displaying one year per cell, and indicating the number of assets in the result set that have associated date× within each year, for each of the displayed years, (b) a month view displaying one month per cell, and indicating the number of assets in the result set that have associated date× within each month, for each of the displayed months, and (c) a day view displaying one day per cell, and indicating the number of assets in the result set that have associated date× within each day, for each of the displayed days; and switching the calendar view between year view, month view and day view, wherein (1) selecting a cell for a specific year within the year view serves to display representations of the assets in the result set that have associated date× within the specific year, (2) selecting a cell for a specific month within the month view serves to display representations of the assets in the result set that have associated date× within the specific month, (3) selecting a cell for a specific day within the day view serves to display representations of the assets in the result set that have associated date× within the specific day, and (4) right-clicking on a cell within the year view serves to display a pop-up window displaying months within the year, and to display the number of assets in the result set that have associated date× within each month, for each of the displayed months.

6. The method of claim 5 wherein the assets are image collections comprising a plurality of individual image assets that are aggregated together, and wherein the date&time associated with an image collection is the earliest of the date× associated with individual image assets in the collection.

7. The medium containing the calendar-based asset organizer of claim 1, wherein the representations of the assets are thumbnail image representations.

8. The medium containing the calendar-based asset organizer of claim 1, wherein selection of a plurality of cells serves to display representations of the assets in the result set that have associated date× within any of the selected cells' date&time ranges.

9. The medium containing the calendar-based asset organizer of claim 1, wherein (5) each cell within the month view comprises sub-cells corresponding to days within that month, and wherein selecting at least one sub-cell within the month view cell serves to display representations of the assets in the result set that have date× within the corresponding at least one day, and (6) each cell within the day view comprises sub-cells corresponding to hours within that day, and wherein selecting at least one sub-cell within the day view serves to display representations of the assets in the result set that have date× within the corresponding at least one hour.

10. The medium containing the calendar-based asset organizer of claim 9, wherein day-of-the-week labels are displayed within each sub-cell of the month view, and selecting a day-of-the-week label serves to select all sub-cells within the month having their day of the week the same as the label day of the week.

11. The medium containing the calendar-based asset organizer of claim 1, wherein double-clicking on a cell within the year view serves to activate the month view, and double-clicking on a cell within the month view serves to activate the day view.

12. The medium containing the calendar-based asset organizer of claim 1, further comprising instructions for deselecting a currently selected cell in the calendar view, and selecting the next or the previous cell whose associated date&time range includes a date&time associated with at least one of the assets in the result set.

13. The medium containing the calendar-based asset organizer of claim 1, wherein the user interface further presents a list of assets in the result set, and wherein selecting at least one asset in the list serves to visually mark cells in the calendar view that have date&time ranges that include a date&time associated with the selected at least one asset.

14. The medium containing the calendar-based asset organizer of claim 1, wherein the user interface further presents a list of assets in the result set, and wherein hovering a mouse cursor over a cell in the calendar view serves to highlight assets in the list having associated date× within the cell's date&time range.

15. The medium containing the calendar-based asset organizer of claim 1, wherein at least one additional search criterion is received, and wherein the user interface makes the display of at least one cell dependent upon results obtained by the digital asset manager for a second search query, the second search query using the at least one additional search criterion and being performed on the subset of assets having associated date× within the cell's date&time range.

16. The method of claim 5, wherein the representations of the assets are thumbnail image representations.

17. The method of claim 5, wherein selection of a plurality of cells serves to display representations of the assets in the result set that have associated date× within any of the selected cells' date&time ranges.

18. The method of claim 5, wherein (5) each cell within the month view comprises sub-cells corresponding to days within that month, and wherein selecting at least one sub-cell within the month view serves to display representations of the assets in the result set that have date× within the corresponding at least one day, and (6) each cell within the day view comprises sub-cells corresponding to hours within that day, and wherein selecting at least one sub-cell within the day view serves to display representations of the assets in the result set that have date× within the corresponding at least one hour.

19. The method of claim 5, wherein double-clicking on a cell within the year view serves to activate the month view, and double-clicking on a cell within the month view serves to activate the day view.

20. The method of claim 5, wherein said presenting further comprises:
deselecting a currently selected cell in the calendar view; and
selecting the next or the previous cell whose associated date&time range includes a date&time associated with at least one of the assets in the result set.

21. The method of claim 5, wherein said presenting further comprises presenting a list of assets in the result set, and wherein selecting at least one asset in the list serves to visually mark cells in the calendar view that have date&time ranges that include a date&time associated with the selected at least one asset.

22. The method of claim 5, wherein said presenting further comprises presenting a list of assets in the result set, and wherein hovering a mouse cursor over a cell in the calendar view serves to highlight assets in the list having associated date× within the cell's date&time range.

* * * * *